Feb. 8, 1938. A. J. WEATHERHEAD, JR 2,107,403
BRAKE CYLINDER ASSEMBLY AND METHOD OF MAKING SAME
Filed Jan. 15, 1935 2 Sheets-Sheet 1

Inventor
ALBERT J. WEATHERHEAD, JR.

By

Attorneys

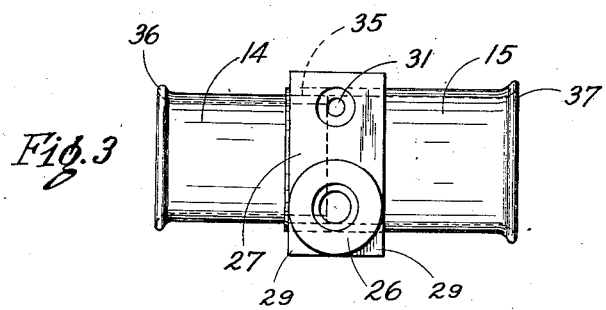
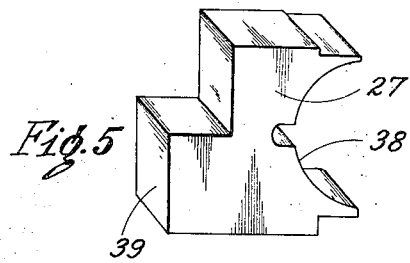
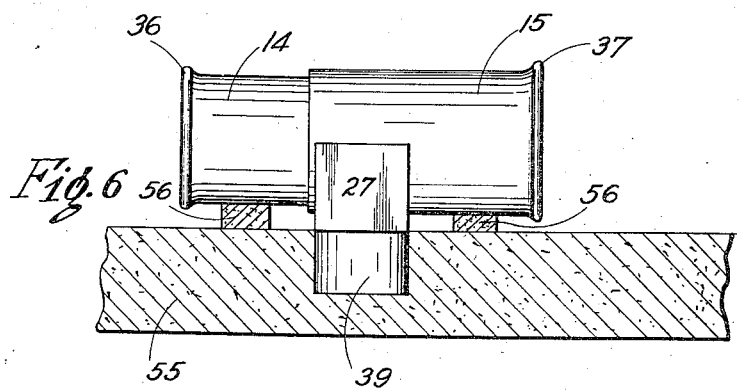
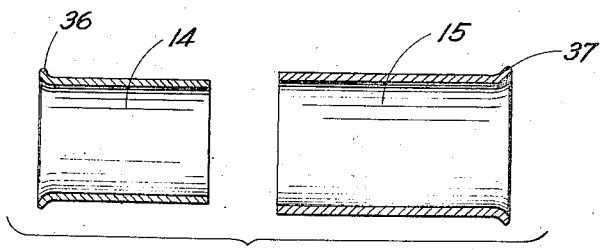

Patented Feb. 8, 1938

2,107,403

UNITED STATES PATENT OFFICE 2,107,403

BRAKE CYLINDER ASSEMBLY AND METHOD OF MAKING SAME

Albert J. Weatherhead, Jr., Cleveland, Ohio, assignor to The Weatherhead Company, Cleveland, Ohio, a corporation of Ohio Application January 15, 1935, Serial No. 1,908

12 Claims. (Cl. 29—152.1)

This invention relates to hydraulic brake cylinder assemblies and methods of making the same, and more particularly to the assembly of the wheel cylinders and supporting and fluid conducting parts for conventional hydraulic vehicle brakes.

It has heretofore been the general practice to make the wheel cylinders and associated parts from a single iron casting. This method of manufacture resulted in heavy cylinders and the various manufacturing operations requires a great deal of machine work with consequent high cost. Furthermore, the castings must be of especially high quality to have the low porosity required to withstand the high operating pressures without leakage. The difficulty of the machining operations has been recently increased by reason of the fact that in some types of modern hydraulic brakes, coaxial cylinders of different diameters are employed, thus requiring separate boring, reaming and grinding operations for each cylinder.

It is among the objects of my invention to provide a light and strong hydraulic brake cylinder assembly which may be manufactured economically with a minimum of machining operations. It is also an object of my invention to provide a method of manufacturing such cylinder assemblies. Another object of my invention is to provide a cylinder assembly wherein the fluid connecting and supporting members are formed separately from the cylinder or cylinders and secured to the cylinder or cylinders by means of a connection which is fluid tight throughout substantially the entire area of contact between the supporting member and the cylinders. Another object of my invention is to provide a brake cylinder assembly wherein the various parts making up the assembly can be expeditiously and economically manufactured and assembled, and wherein a minimum of machining operations is required. Another object of my invention is to provide a cylinder having a smooth internal working surface particularly adapted for use with steel pistons. Another object is to provide a method of making such a working surface.

Figure 1:
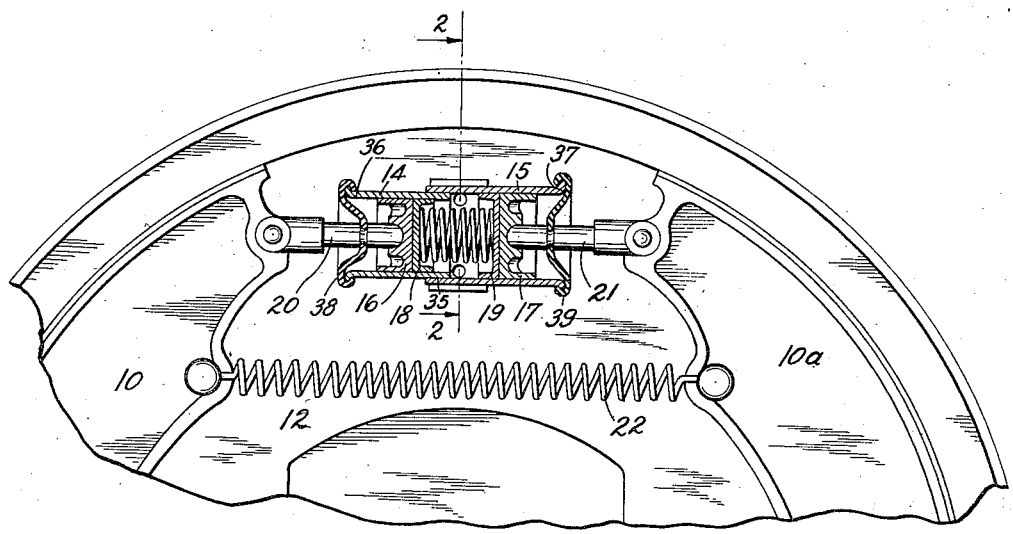
Figure 2:
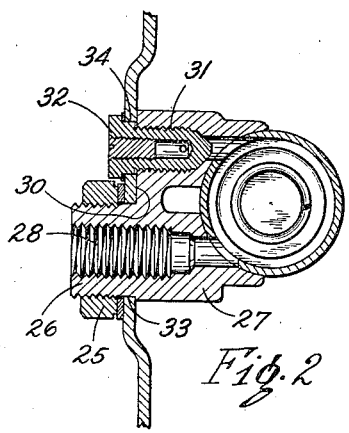

Further objects and advantages of my invention will become apparent from the following description of a preferred form thereof, reference being made to the accompanying drawings. The essential characteristics are summarized in the claims:

In the drawings, Figure 1 is a fragmentary side elevation of a hydraulic brake of the conventional type embodying my brake cylinder assembly, parts of the mechanism being shown in section; Figure 2 is a section through my brake cylinder assembly taken on the line 2—2, Figure 1; Figure 3 is a side elevation of my cylinder removed from the brake; Figure 4 illustrates the members forming the cylinders of the device shown in Figure 1 before assembly; Figure 5 illustrates the fluid conducting saddle which is adapted to be secured to the cylinders; and Figure 6 illustrates a step in the assembly of the parts illustrated in Figures 3, 4 and 5.

Briefly, I attain the objects of my invention and produce brake cylinders having important advantages over any heretofore known, by forming the cylinders themselves from short pieces of seamless tubing or from drawn cups, and by securing the fluid conducting and cylinder supporting parts to the cylinder preferably by copper brazing. In the preferred form of my invention as illustrated in the drawings, two different diameters are employed and I form the cylinders from tubing or cups of different diameters telescoped together, while the supporting and attaching means may be formed of bar stock. It is to be understood, however, that cylinders of uniform diameter may be employed, and that the supporting and attaching means may be made by different methods.

In applying my cylinders to hydraulic brakes of conventional design, I preferably make the fluid conducting and attaching means in the form of a saddle having an arcuate seat secured to the outer surface of the brake cylinder. A fluid tight connection is made between the arcuate seat of the saddle and the cylinder throughout substantially the entire area of contact, preferably by means of copper brazing. I prefer to assemble the various parts before the required passageways are drilled, and thereafter drill and tap the necessary fluid connections. It is to be understood, however, that the steps hereinafter described may be varied and the design of the various parts may also be changed for different adaptations of my cylinder assembly to different types of brakes.

In order to provide a smooth working surface in the interior of the cylinders, I preferably coat the interior of the cylinders with copper before assembly. The subsequent brazing operation, which is carried out in a furnace having a reducing atmosphere, results in the production of a thin film of copper iron alloy on the interior surfaces of the cylinders which needs only to be burnished to produce an excellent bearing surface for the pistons. The copper alloy surface is particularly desirable when the cylinder is to be used in conjunction with steel pistons.

Referring in detail to the drawings, in Figures 1 and 2, I have illustrated an adaptation of my invention to a type of hydraulic brake now in wide use. The brake which is of conventional construction may have brake shoes 10 and 10a pivoted at their lower ends to anchor pins (not shown) which are in turn secured to a backing plate 12 suitably mounted on the wheel axle. The brake shoes may be swung outwardly into engagement with the brake drum by means of fluid pressure within the communicating cylinders 14 and 15 and acting on pistons 16 and 17. To prevent leakage of the fluid, the pistons are provided with the usual rubber cups 18 and 19, and the pistons actuate the brake shoes through suitable connecting rods 20 and 21. Upon release of the fluid pressure, the shoes are moved out of engagement with the drum by retractor springs 22.

The brake cylinders are supported on the backing plate 12 by means of a nut 25 threaded on the projection 26 of the saddle member 27 which extends through the opening 33 in the backing plate, the shoulders 29 and flat surfaces 30 being drawn tightly against the backing plate. The saddle member 27 is preferably copper brazed to the outer surface of the cylinder 15 and is drilled and tapped through the projection 26 to provide a passageway 28 for fluid under pressure which may be supplied through a hose and a suitable connection fitting (not shown). At the top of the cylinder, another opening 31 is drilled through the saddle member and the walls of the cylinder to provide a vent for removing all air from the system. The passageway 31 may be closed by a suitable plug 32 which extends through the opening 34 in the backing plate and assists in retaining the cylinder on the plate.

It will be noted that cylinder 15 has a larger internal diameter than cylinder 14. In some types of brakes, this is done in order to equalize the wear on brake shoes 10 and 10a. In case the normal forward rotation of the wheel to which the brake is attached is in the direction shown by the arrow in Figure 1, the wrapping action of the brake shoe 10 under ordinary circumstances would cause it to bear harder against the drum 13 than the brake shoe 10a if the expanding force on both shoes were equal. To counteract this tendency and equalize the wear and braking effort of the two shoes, the cylinder 15 which actuates the shoe 10a has a slightly larger cross sectional area than the cylinder 14 so that a greater expanding force will be exerted on the shoe 10a, thus compensating for the self-energizing effect of the shoe 10 in the forward rotation of the brake. In another type of brake the arrangement is reversed in order to exert the greater expanding force on the forward shoe and thus reduce the pressure which must be applied to the pedal. The general design of the brake will not be discussed in detail herein, as the brake per se forms no part of the present invention.

As shown particularly in Figures 4 and 5, the cylinders 14 and 15 and the saddle member 27 are all formed separately. The cylinders 14 and 15 may comprise short sections of seamless tubing or preferably drawn cups having the closed ends of the cups cut off after the drawing operation. The cylinders telescope together as indicated at 35 in Figures 1 and 3, and the ends of the cylinders are flared or bell mouthed slightly as at 36 and 37, the flare of the internal surface assisting the operation of assembling the pistons and rubber cups within the cylinders, while the flared outer surface provides a means of retaining the rubber dust caps 38 and 39.

The saddle member 27 may be formed by cutting off bar stock drawn to have substantially the cross sectional shape illustrated in Figure 4 and having an arcuate surface 38 adapted to engage the outer surface of the larger cylinder 15 and a portion 39 which is subsequently machined to cylindrical form and threaded to form the projection 26 and the shoulder 29.

To assemble the various parts into a strong unitary assembly, I preferably coat each of the parts with a thin coating of copper, either by electroplating or by dipping or spraying with a lacquer solution containing copper powder in suspension. Thereafter the cylinders 14 and 15 are telescoped together to the required amount and the saddle member 27 placed in contact with the outer surface of the cylinder 15. Preferably, the assembly is supported as shown in Figure 6 by means of a block 55 of carbon or other refractory material which engages the supporting saddle 27, on which the cylindrical members rest. The ends of the cylinders may be additionally supported by smaller carbon blocks 56, if desired. The assembled parts are then placed in a furnace having an atmosphere of hydrogen or other reducing gas, and heated to a temperature of approximately 2150° F. At this temperature, the copper in the coating of the various parts becomes fluid, and in the reducing atmosphere of the furnace forms an alloy with the underlying steel surface. The copper is drawn by capillary attraction into all of the spaces between the various parts and, as is well known in the art of copper brazing, results in a copper bond between the assembled parts which is substantially as strong as the parent metal itself.

The copper penetrates the pores of the steel, forming an alloy therewith, and thus the interior surfaces of the cylinders are provided with a layer of copper and copper iron alloy, which is especially smooth and forms an excellent bearing surface for the pistons. Sufficient copper is supplied to take up any inequalities between the arcuate surface 38 of the saddle member and the exterior surface of the cylinder 15, so that the joint between the saddle member and cylinder is leak proof through substantially the entire area, and likewise a leakage proof joint is formed between the exterior of cylinder 14 and the interior of cylinder 15. Thus by the single brazing operation, the various parts of the assembly are strongly secured together, leak proof joints are formed where needed, and an excellent bearing surface is provided on the interiors of the cylinder.

At high temperatures in the furnace, the steel is apt to become somewhat soft and if not properly supported, might possibly be distorted by its own weight. I have found, however, that the difficulties due to the likelihood of distortion are eliminated by supporting the assembled parts in the manner illustrated in Figure 6. It will be noted that by this method of supporting, the tubular cylinders are supported throughout nearly 180 degrees by the heavier steel member, while further support is given by the double thickness of metal in this zone. Likewise the flared ends 36 and 37 of the cylinders give additional strength and rigidity at these points, and as a result no measurable distortion takes place during the heating operation.

As previously stated, I prefer to carry out the drilling and tapping operations after assembly of all of the parts. The assembled unit may be mounted in a suitable jig, and the passageways 29 and 31 in the saddle member and the openings in the depending portions 49 and bosses 50 of the supporting plate drilled and tapped. This mode of operation has important advantages, particularly in connection with the openings 28 and 31. The passageway 31 must be drilled tangentially through the wall of the cylinder 15 in order that all air may be removed from the cylinders through the vent. Such a tangential drilling operation on an ordinary tube requires a special support for the tool, whereas by carrying out the drilling operation after the assembly, the saddle member itself forms the necessary support. Furthermore, by drilling the passageways after assembly, proper registration of the openings in the various parts is assured and the preliminary steps of the assembly operation can be carried out more expeditiously.

The drawn cups which preferably comprise the cylinders 14 and 15 may be formed with great accuracy so that the interior surface of the cylinders can be finished within the necessary tolerances merely by burnishing the interior copper and copper alloy surfaces. The simple burnishing operation produces a smooth copper alloy surface and no further reaming or grinding is required.

It will be obvious to those skilled in the art that the various steps in the production of my cylinder assembly can be carried out in different orders and in different manners. For example, the machining operations or part of them can be carried out before the brazing operation. If desired, the copper can be supplied by some copper pellets or wires disposed adjacent the surfaces to be joined together instead of by coating the entire surfaces of the various parts. However, if the machining operations are carried out first, care must be taken to see that copper does not flow into the threads of the tap holes, for it is very difficult to retap the holes after copper has been deposited in the threads. It is perfectly satisfactory, however, to first drill the holes, then carry out the brazing operation, and thereafter tap the threads in the holes. While I prefer to coat the interior of the cylinders with copper as well as the exterior, because the interior provides an excellent bearing surface while the exterior surface provides a corrosive resisting surface, nevertheless the copper coatings can be omitted, without departing from the teachings of my invention.

From the foregoing description, it will be seen that because of the great strength of the welded joints and their leak proof qualities, I have produced an extremely strong brake cylinder assembly. My cylinder assembly is light as compared with present types of assemblies because of the greater strength of the materials employed as compared to cast iron. By my method, many machining operations are eliminated and the assembly operations and machining can be carried out expeditiously and economically. My method produces cylinders having excellent interior surfaces for engagement with the pistons which operate therein, and a cylinder assembly made according to my invention may be adapted to various types of brakes, as well as other uses wherein fluid pressures are involved.

In the foregoing specification, I have described a preferred form of my brake cylinder assembly and methods of making the same. Modifications in both the assembly and the method will be apparent to those skilled in the art. It is therefore to be understood that my patent is not limited to the embodiment described herein or in any manner other than by the appended claims when given the range of equivalents to which my patent may be entitled.

I claim:

1. The combination of a tubular brake cylinder formed of sheet stock having open outwardly flared ends with a fluid conducting and anchoring member having a surface conforming to the side wall of the tubular member and bonded thereto with a permanent fluid tight metallic bond throughout substantially the whole of the area of contact therebetween, and having a passageway therein extending through the wall of said tubular member within the said fluid tight bonded area between said members, and means associated with said fluid conducting and anchoring member for securing it to an external support.

2. The combination of a tubular brake cylinder formed of sheet stock having open outwardly flared ends and a stepped mid-portion with a fluid connecting and anchoring member having an arcuate wall conforming with the side wall of the tubular member and bonded thereto adjacent the stepped mid-portion thereof with a permanent fluid tight metallic bond throughout substantially the whole of the arcuate area of contact therebetween and having passageways therein extending through the wall of said tubular member within the said fluid tight bonded area between said members, and means associated with said last named member for securing it to an external support.

3. The method of making a fluid pressure brake cylinder which comprises telescoping two tubular steel parts together, positioning a saddle-like steel member over the outer of said tubular parts where the tubular parts overlap, copper brazing the three parts together to form a fluid tight connection throughout the areas of contact and thereafter forming passageways through said member and tubular parts in the zone of the copper brazed joints therebetween.

4. A method of making a fluid pressure brake cylinder of a steel cylindrical tubular part and a steel anchoring and connecting part having a surface adapted substantially to coincide with a wall of the tubular part, which comprises copper brazing said part to said member, supplying sufficient copper in the brazing operation to cause at least part of the interior surface of said part to be coated with copper, forming fluid passageways through said member into said part within the area of copper brazed connection therebetween, and finishing the interior copper surface of the tubular part to form a smooth working wall for a piston to be operated therein.

5. A method of making fluid pressure brake cylinders which includes the steps of shaping the open end of a ferrous cylinder to provide a peripheral overhanging cap retaining portion, forming a ferrous fluid conducting part having an arcuate surface adapted to conform to the outer surface of said cylinder, supporting said fluid conducting part on a refractory support and supporting said cylinder on the arcuate surface of said fluid conducting part, supplying non-ferrous bonding metal to the area of contact of said part and said cylinder and heating the assembled parts to a temperature sufficient to form an alloy bond between said part and said cylinder, the arcuate surface of said fluid conducting part supporting said cylinder to assist in preventing the deformation of said cylinder during the heating thereof.

6. A method of making fluid pressure brake cylinders comprising forming a ferrous cylinder having an open end, flaring the open end portion of the cylinder, forming a ferrous fluid connection member, assembling the member and the cylinder, supplying copper to the contiguous surfaces of the member and the cylinder, and thereafter heating the assembly to a sufficiently high temperature to cause the formation of an alloy bond between the member and the cylinder, the flared end of the cylinder assisting in preventing the deformation of said cylinder during the heating thereof.

7. That method of making a fluid pressure brake cylinder which comprises forming a pair of tubular steel cylinders of different diameters, telescoping said cylinders together throughout a portion of their length, forming a fluid inlet member with an arcuate surface adapted to engage an exterior cylindrical surface of the larger of said two cylinders and thereafter securing said two cylinders and said fluid inlet member together.

8. That method of making a fluid pressure brake cylinder which comprises forming a pair of tubular steel cylinders of different diameters, telescoping said cylinders together throughout a portion of their lengths, forming a fluid inlet member with an arcuate surface adapted to engage an exterior cylindrical surface of the larger of said two cylinders and thereafter securing said two cylinders and said fluid inlet member together by a single copper brazing operation.

9. The combination of a tubular brake cylinder formed of sheet metal stock having the open end thereof provided with a peripheral overhanging cap retaining flange, a fluid conducting and anchoring member having a surface conforming to the side wall of the tubular member and bonded thereat with a permanent fluid tight metallic bond throughout substantially the whole of the area of contact therebetween and having a passageway therein extending through the wall of said tubular member within the said fluid tight bond arranged between said members and means associated with said fluid conducting and anchoring member for securing the same to an external support.

10. The combination of a tubular ferrous metal cylinder having an open end provided with a peripheral overhanging dust cap retaining flange and a stepped mid portion with a fluid connecting and anchoring member having an arcuate wall conforming to the side wall of the tubular member and bonded thereto adjacent a stepped mid portion thereof with a permanent fluid tight metallic bond throughout substantially the whole of the arcuate area of contact therebetween and having passageways therein extending through the wall of said tubular member within the said fluid tight bonded area between said members, and means associated with said last named member for securing the same to an external support.

11. A method of making a fluid pressure brake cylinder of an apertured steel cylindrical tubular part and an apertured steel anchoring and connecting part having a surface adapted substantially to coincide with a wall of the tubular part which comprises copper brazing said part to said member with the apertures of said part and said member in alignment to form a brake fluid conduit, supplying sufficient copper in the brazing operation to cause at least a part of the interior surface of said part to be coated with copper, and finishing the interior copper surface of the tubular part to form a smooth working wall for a piston to be operated therein.

12. That method of making fluid pressure brake cylinders which comprises forming a cylindrical blank of steel stock, shaping a ferrous supporting fluid inlet block to embrace and intimately contact said blank, temporarily securing said block and blank in assembled relation and applying a quantity of copper to said assembly sufficient to copper braze the parts in assembled relation and form a copper alloy lining for said blank, thereafter heating the assembly to copper braze the parts together and form said lining and burnishing and polishing the copper alloy lining of the cylindrical blank.

ALBERT J. WEATHERHEAD, Jr.